(12) United States Patent
Hogg (10) Patent No.: US 12,518,583 B2
(45) Date of Patent: *Jan. 6, 2026

(54) METHOD AND APPARATUS FOR OPERATING A RFID SYSTEM

(71) Applicant: Essex Electronics, Inc., Carpinteria, CA (US)

(72) Inventor: Robert D. Hogg, Santa Barbara, CA (US)

(73) Assignee: Essex Electronics, Carpinteria, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/640,499

(22) Filed: Apr. 19, 2024

(65) Prior Publication Data

US 2024/0273961 A1 Aug. 15, 2024

Related U.S. Application Data

(62) Division of application No. 17/714,407, filed on Apr. 6, 2022, now Pat. No. 11,995,936, and a division of
(Continued)

(51) Int. Cl.
*G07C 9/10* (2020.01)
*G06K 7/10* (2006.01)
(Continued)

(52) U.S. Cl.
CPC ........... *G07C 9/28* (2020.01); *G06K 7/10366* (2013.01); *G07C 9/00309* (2013.01); *G07C 9/10* (2020.01)

(58) Field of Classification Search
CPC ...... G07C 2009/00793; G07C 2209/63; G07C 9/00309; G07C 9/10; G07C 9/28; G07C 2009/00357; G07C 2009/00412; G07C 9/29; G07C 9/00079; G07C 9/00111; G07C 9/00119; G07C 2009/0096; G07C 2209/64; G07C 9/00896; G07C 9/00944; G07C 9/257; G07C 2009/00317; G07C 2009/00761; G07C 2009/00769; G07C 2209/08; G07C 2209/14; G07C 2209/65;
(Continued)

(56) References Cited

U.S. PATENT DOCUMENTS 11,995,936 B2 * 5/2024 Hogg ................. G06K 7/10366
2017/0061715 A1 * 3/2017 Busch-Sorensen ..........................
G06K 7/10366
2019/0073846 A1 * 3/2019 Kamkar ................... G07C 9/28

* cited by examiner

*Primary Examiner* — Dionne Pendleton
(74) *Attorney, Agent, or Firm* — Kenneth D'Alessandro (57) ABSTRACT

A system for operating a radio frequency identification (RFID) system includes a remotely operable access point at an authentication point. A first trigger sensor detects an RFID signal from an RFID device associated with a user at a first trigger distance from the authentication point. A controller responsive to a signal detected from the RFID device exchanges data with the RFID device and determines whether the RFID device is authorized. A second trigger sensor exchanges data with the RFID device at a second trigger distance closer to the authentication point than the first trigger distance. The controller is responsive to data received from the RFID device at the second trigger sensor to enable the controlled access barrier to grant access to the user at the access point after exchanging data with the RFID device at the second trigger sensor only if the user has been authenticated.

10 Claims, 8 Drawing Sheets

Related U.S. Application Data application No. 16/116,658, filed on Aug. 29, 2018, now Pat. No. 11,328,546.

(51) Int. Cl.
*G07C 9/00* (2020.01)
*G07C 9/28* (2020.01)

(58) Field of Classification Search
CPC ........ G07C 9/00; G07C 9/00563; G07C 9/25; G06K 7/10366; G06K 9/00335; G06K 19/0723; G06K 7/10297; G06K 7/10336; G06V 40/20; G06V 40/172; G06V 10/25; G06V 20/52; G06V 40/165; G06V 40/166; G06V 40/171; G06F 3/0484; G06F 21/32; G06Q 20/327; G06Q 10/10; G07B 15/00; G07B 15/04; H04N 7/183; H04N 7/186; H04N 7/188; H04W 48/16; H04W 4/80; H04W 12/082; H04W 4/021; H04W 4/023; H04W 4/30; H04W 4/33; H04W 4/42; Y04S 40/20; H04L 12/282; H04L 12/2829; H04L 2463/082; H04L 63/0861; H04B 5/24; G10L 17/00; G10L 17/08; G10L 17/22; G06T 7/00; B66B 1/468; B66B 2201/4653; B66B 2201/4676; E05F 15/77
See application file for complete search history.

METHOD AND APPARATUS FOR OPERATING A RFID SYSTEM

BACKGROUND

The present invention relates to operating active radio frequency identification (RFID) systems. More particularly, the present invention relates to reducing response times in active RFID systems.

Recently, active RFID systems have come into use with devices such as smart phones equipped with Bluetooth or other longer distance technologies. While convenient, these methods have limitations. The first is that the long-range capability of these RFID systems (many feet) can cause confusion in applications such as close-spaced access control systems having controlled access barriers such as doors, turnstiles, and the like. Various schemes for operating active RFID systems have been adopted, such as requiring a twisting or turning motion (HID access cards and readers) or a physical tapping of the device (Samsung uses this for activation in its near field communication (NFC) protocol) or pressing a button to start the process or starting the process when the device is at a close distance by measuring the signal strength using, for example, the RSSI (Receive Signal Strength Indicator) function in an IEEE 802.11 system. Using the RSSI method as an example, the current practice is to trigger the process at a predetermined signal level which then starts the authentication process.

All of these mechanisms work but all have certain drawbacks. The principal drawback is the delay time for the credential to be authenticated. In higher security applications, the processing delay can be several seconds. From the user point of view, this is a major issue as there is no way to tell what is going on and why the gate, door, turnstile or other access point is not operating. This causes problems at the access control points because the throughput of the access point, such as, for example a turnstile, is expected to be between about 40-60 accesses per minute. If a three second delay is introduced into the access system by the authentication process, the maximum throughput drops to less than about 20 per minute. This is a significant problem.

Figure 1:
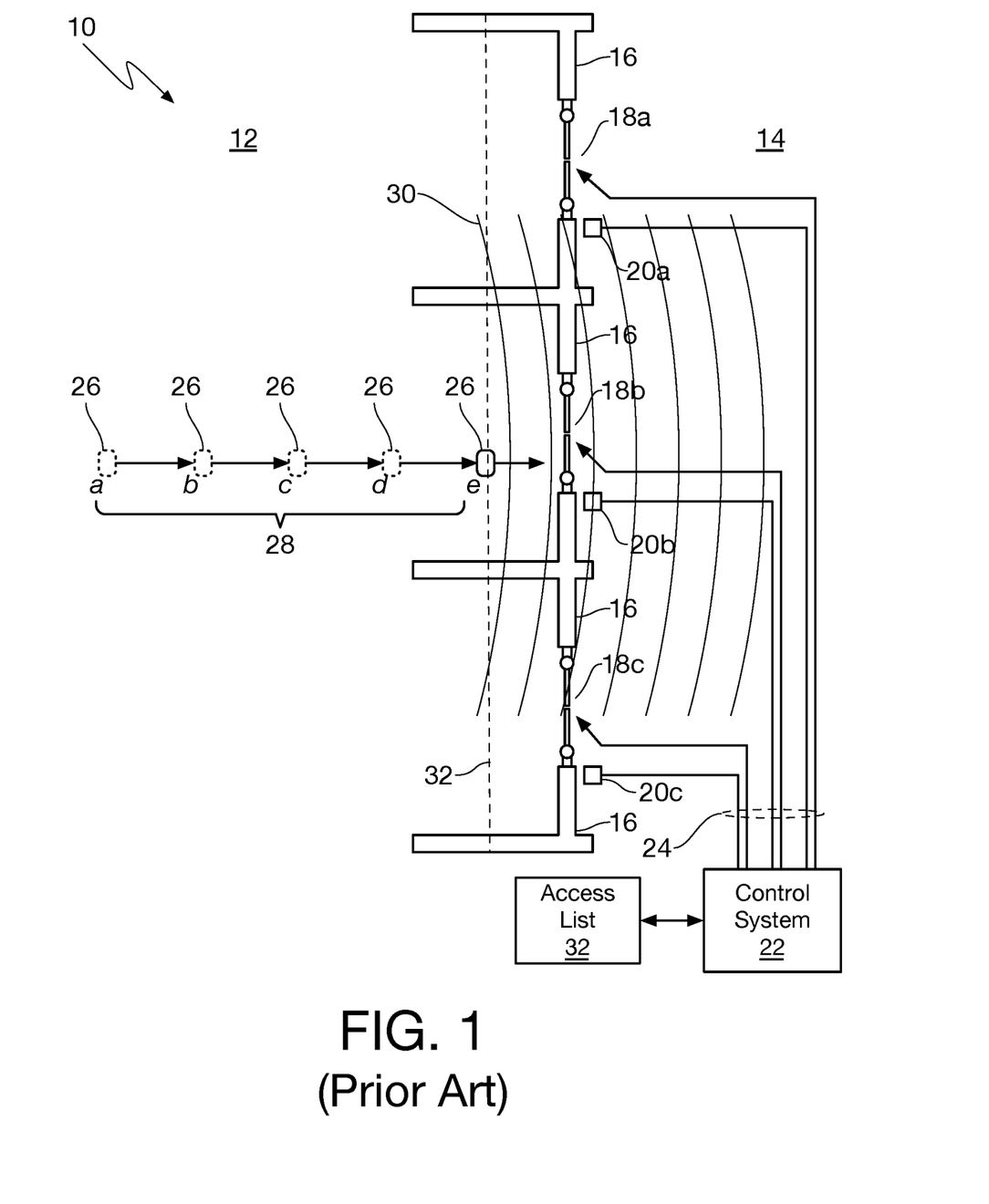
FIG. 1 is a diagram showing an illustrative prior-art system for operating a controlled access barrier at an access point.

FIG. 1 is a diagram showing an illustrative prior-art system 10 for operating a controlled access barrier at an access point separating a public area identified at reference numeral 12 from a controlled access area identified at reference numeral 14. The controlled access area 14 may take many forms, such as, but not limited to, transit systems, commercial buildings, stadiums and other entertainment venues, government facilities, etc. An access barrier 16, such as a wall, a fence, or other barrier separates the public area 12 from the controlled access area 14. FIG. 1 shows a plurality of access points 18a, 18b, and 18c, which, for purposes of illustration are depicted as turnstiles. Persons of ordinary skill in the art will readily appreciate that the access points 18a, 18b, and 18c could be doors, gates, or any other means for accessing the controlled access area. Although FIG. 1 arbitrarily depicts a system for controlling three access points, such skilled persons will appreciate that some applications will require but a single access point while other applications will require the use of more than one access point.

A RFID reader 20a is positioned proximate to access point 18a. Similarly, RFID readers 20b and 20c are positioned proximate to access points 18b and 18c, respectively. RFID readers are coupled to a control system 22 by communication links collectively identified by reference numeral 24. Persons of ordinary skill in the art will appreciate that communication links 24 could be hardwired or wireless communication links although hardwired communication links may provide an enhanced level of security over wireless communication links.

FIG. 1 depicts a RFID device 26 in dashed lines at locations designated a, b, c, and d successively closer to the access point 18b. The RFID device 26 is shown in solid lines at the location e closest to the access point 18b. As will be appreciated by persons of ordinary skill in the art, the RFID device may take numerous forms, a cellular telephone being a common such device. The RFID device may be carried by a person or may be, for example, attached to a vehicle.

Across the region including locations a, b, c, and d identified by reference numeral 28, the strength of the RFID signal (represented by curved lines one of which is identified by reference numeral 30) transmitted by the RFID device 26 is below a threshold set by the control system 22 for establishing a communication link between the RFID reader 20b and the RFID device 26 (such as by use of an RSSI protocol). Once the RFID device 26 is located at a position e identified by dashed line 32, it is close enough to the RFID reader 20b, a communication link is established between the RFID reader 20b and the RFID device 26 and data is exchanged between the RFID reader 20b and the RFID device 26. Data identifying the RFID device 26 is received by the RFID reader 20b and is communicated to the control system 22. The control system 22 queries an access list 32 to determine whether the RFID device is authorized to permit entry into the controlled access area 14. If the RFID device is authorized to permit entry into the controlled access area 14, the control system 22 sends a control signal to the access point 18b to enable entry through the access point 18b.

In many such systems, a communication link is not established between the RFID device 26 and the RFID readers 20a and 20c, located further away from the RFID device 26 than RFID reader 20b. In some systems, the controller can use the relative signal strengths of the RFID signal sent by RFID device 26 to determine which one of access points 18a 18b, and 18c should be activated.

Figure 2:
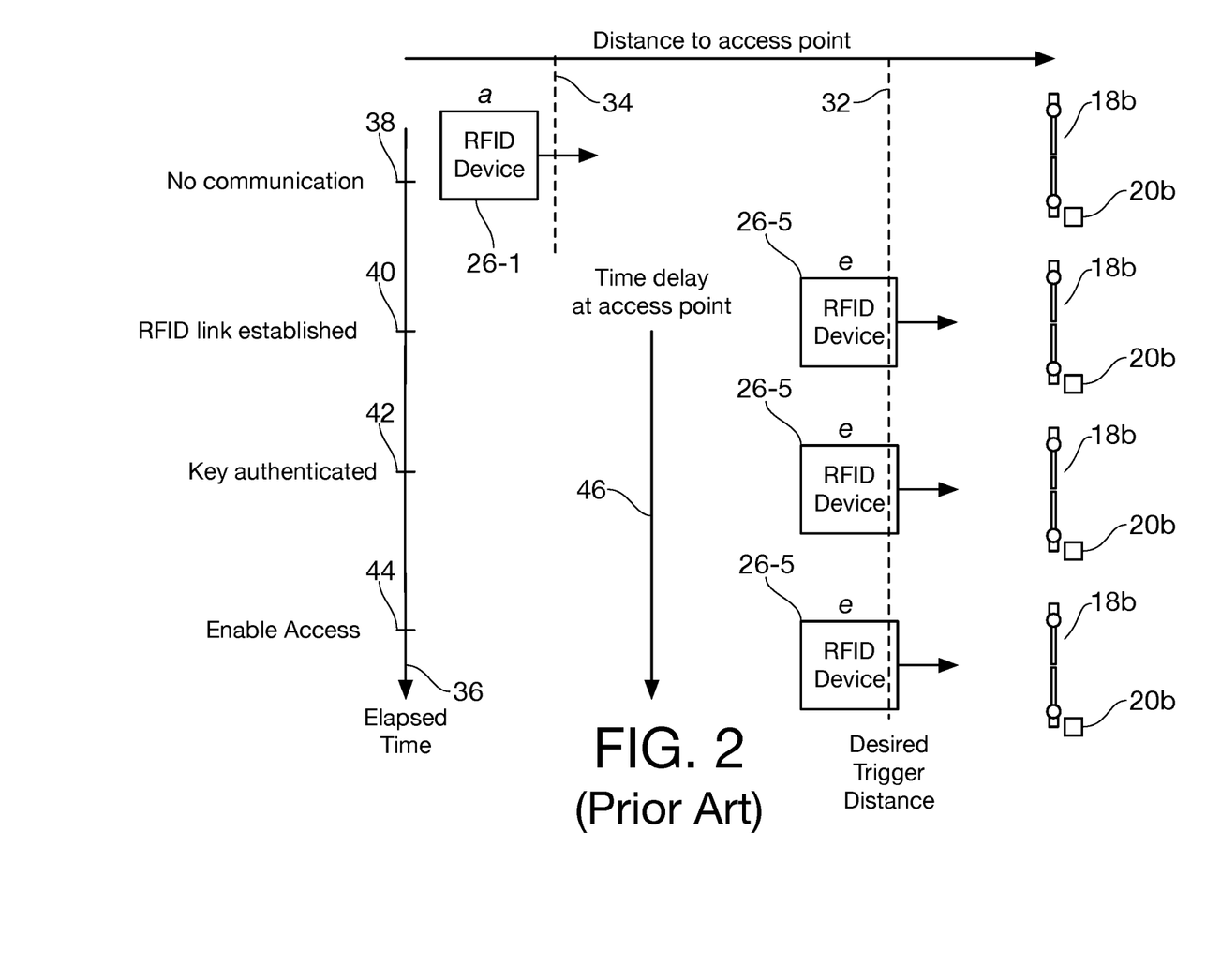
FIG. 2 is a diagram showing timing considerations for the operation of an illustrative prior-art system for operating a controlled access barrier at an access point, such as the system depicted in FIG. 1.

Referring now to FIG. 2, a diagram shows the operation of an illustrative prior-art system for operating a controlled access barrier at an access point, such as the system depicted in FIG. 1. Numerous elements of the system 10 of FIG. 1 are shown in FIG. 2 and will be identified using the same reference numerals used to identify those elements in FIG. 1.

The RFID device 26 is shown at the top of FIG. 2 approaching the access point 18b at position a located at a distance from the access point 18b identified at reference numeral 34. At this distance 34 from the access point 18b at a time indicated on an elapsed time scale 36 at reference numeral 38, no communication is established between the RFID device and the RFID sensor 20b.

At a time indicated at reference numeral 40 at a desired trigger distance from the access point 18b identified at reference numeral 32, the RFID device 26 is shown at the approaching the access point 18b at position e and an RFID link is established between the RFID device 26 and the RFID sensor 20b. The authentication procedure that is performed in the control system 22 of FIG. 1 begins at this time and is completed at a time indicated at reference numeral 42. At a time indicated at reference numeral 44, the control system 22 of FIG. 1 then sends the control signal to the access point 18b to enable entry through the access point 18b.

Persons of ordinary skill in the art will appreciate that the time scale 36 is shown for purposes of illustration only and is not linear in that the actual times 40, 42, and 44 will depend on system sensitivity, latency, and processing throughput. FIG. 2 illustrates that a time delay identified at reference numeral 46 will exist at the access point 18*b* between the time that the RFID device 26 is located at position e and comes into range of the RFID sensor 20*b*.

As previously stated, this time delay 46 at the access point 18*b* is the necessary delay time for the credential to be authenticated. In higher security applications, this processing delay can be several seconds, and can be a major issue as there is no way for the user to determine why the gate, door, turnstile or other access point is not operating. This time delay 46 reduces the throughput of the access point. Where the access point 18*a* is, for example a turnstile, an average throughput is expected to be between about 40-60 accesses per minute as was previously noted. If the time delay at the access point 18*a* introduced into the access system by the authentication process is three seconds, the maximum throughput at the access point 18*a* drops to less than about 20 per minute. This is a significant problem.

Persons of ordinary skill in the art will appreciate that there are places other than access points where users would use an RFID link for authentication. One non-limiting example is for elevator dispatching and control (floor choice is an example). An elevator dispatch system or other system may employ a kiosk in a hall to direct people to the proper elevator or other location. On upper floors, the access control system can be employed to limit which direction a particular person could go. For instance, a person may be allowed access to floor 21, but may not be permitted to request an up elevator from that floor. Such controls could be located either in the foyer of a building, at the main bank of elevators, or on an individual floor. These are all versions of access control systems.

Increasing the speed of the authentication process for an existing access system may not be an option due to limitations of the computing portion of the security system chosen.

There exists a need for a system and method for operating an RFID system such as a controlled access system that addresses the limitations of the prior art.

BRIEF DESCRIPTION

In accordance with one aspect of the present invention, a method is described which gives an easily implemented apparent reduction in the response time of RFID access systems.

According to one aspect of the present invention a method for operating a controlled access barrier at an access point includes exchanging data with an RFID device associated with a user in response to a first trigger event, determining from data received from the RFID device whether to authenticate the user, and exchanging data with the RFID device in response to a second trigger event occurring after the first trigger event, and only if the user has been authenticated, operating the controlled access barrier to grant access to the user at the access point after exchanging data with the RFID device in response to the second trigger event.

The method may include releasing a latch mechanism in the controlled access barrier. The controlled access barrier may take many forms. A non-exhaustive list of these forms includes a latch mechanism of a turnstile, a latch mechanism of a gate or door.

According to one aspect of the invention, the first trigger event is exchanging data with the RFID device at a first received signal strength threshold from the RFID device, and the second trigger event is exchanging data with an RFID device at a second received signal strength threshold from the RFID device greater than the first received signal strength threshold.

In some embodiments of the invention, the device is worn by or carried by the user. In such embodiments the first trigger event is sensing the presence of the user at a first distance from the access point, and the second trigger event is sensing the presence of the user at a second distance from the access point closer to the access point than the first distance. Sensing the presence of the user may include one of sensing at least one user action, interruption of a light beam, sensing pressure on a pressure pad on which the user has made contact, and sensing the presence of the user by one of transmission and reflection of energy from the user.

In accordance with another aspect of the invention, a method for operating one of a plurality of controlled access barriers at an access point includes exchanging data with an RFID device associated with a user in response to a first trigger event, determining from the detected RFID signal whether to authenticate the user, and exchanging data with the RFID device near at least one of the controlled access barriers in response to a second trigger event occurring after the first trigger event. Only if the user has been authenticated, the one of the at least one controlled access barriers from which a detected RFID signal from the device is the strongest is operated to grant access to the user at the access point in response to the second trigger event.

BRIEF DESCRIPTION OF THE DRAWING FIGURES

The invention will be explained in more detail in the following with reference to embodiments and to the drawing in which are shown.

DETAILED DESCRIPTION

Persons of ordinary skill in the art will realize that the following description of the present invention is illustrative only and not in any way limiting. Other embodiments of the invention will readily suggest themselves to such skilled persons.

The various disclosed embodiments of the invention are illustrative of the invention. All of the embodiments of the invention speed up the authentication time perceived by a user of the system. Some embodiments relate to directly operating a controlled access barrier. Other embodiments of the invention implement an authentication process that may later be used to grant access to physical spaces or grant access to operate various instrumentalities.

In the various embodiments of the invention, the RFID device may communicate using a protocol such as IEEE 802.15, known as Bluetooth. Persons of ordinary skill in the art will appreciate that the present invention is not limited to systems and methods that employ the Bluetooth standard, but apply to systems and methods that employ any wireless communications protocol.

Figure 3:
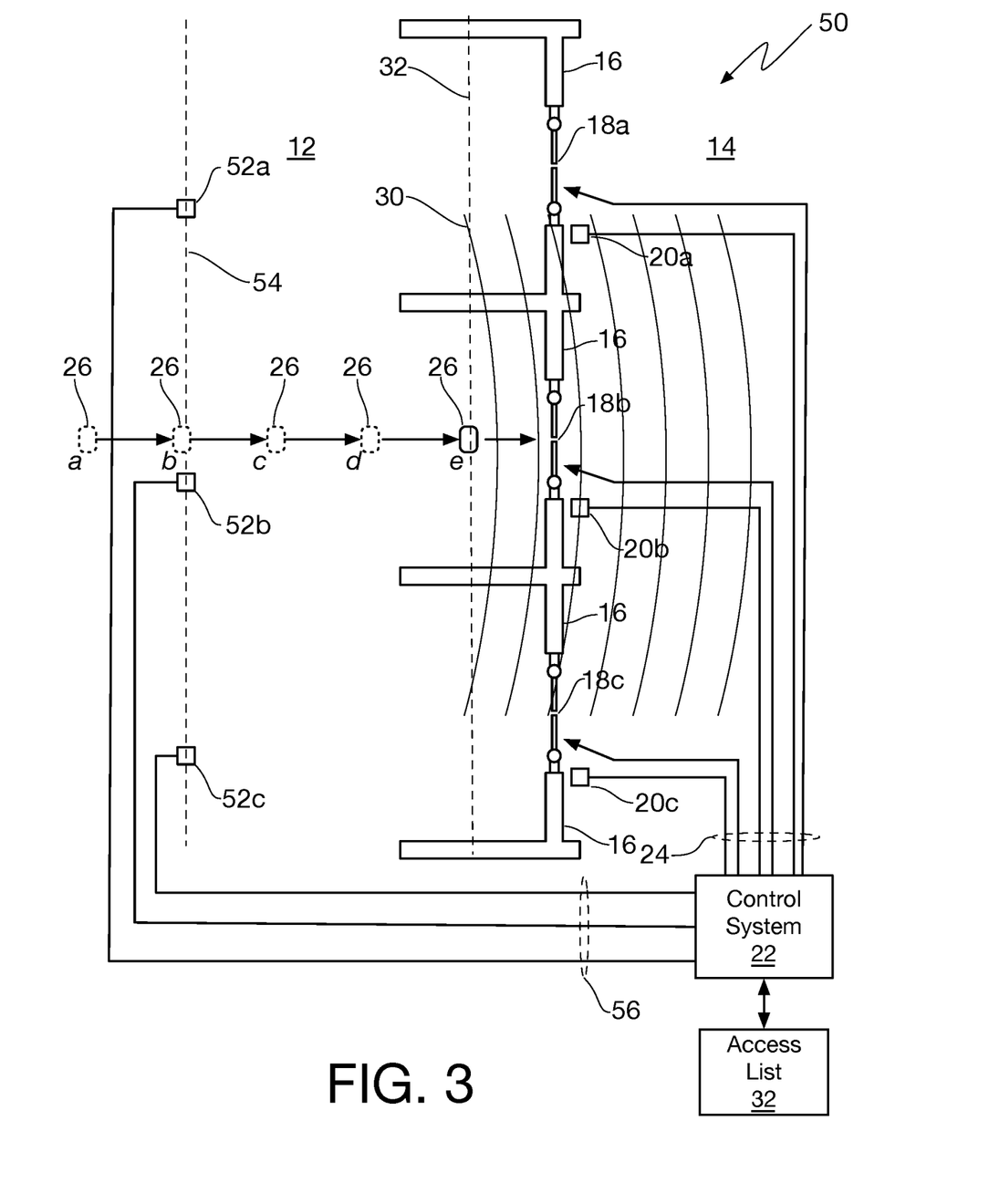
FIG. 3 is a diagram showing an illustrative system for operating a controlled access barrier at an access point in accordance with the present invention.

Referring first of all to FIG. 3, a diagram shows an illustrative system 50 for operating a controlled access barrier separating a public area identified at reference numeral 12 from a controlled access area identified at reference numeral 14 at an access point in accordance with the present invention method for decreasing perceived response time for RFID access. Numerous elements of the system 50 of FIG. 3 are similar to elements in the system 10 of FIG. 1 and will be identified using the same reference numerals used to identify those elements in FIG. 1.

The controlled access area 14 may take many forms, such as, but not limited to, transit systems, commercial buildings, stadiums and other entertainment venues, government facilities, etc. An access barrier 16, such as a wall, a fence, or other barrier separates the public area 12 from the controlled access area 14. FIG. 3 shows a plurality of access points 18a, 18b, and 18c, which, for purposes of illustration are depicted as turnstiles. Persons of ordinary skill in the art will readily appreciate that the access points 18a, 18b, and 18c could be doors, gates, or any other means for granting access to the controlled access area. Although FIG. 3 arbitrarily depicts a system for controlling three access points, such skilled persons will appreciate that some applications will require but a single access point while other applications will require the use of more than one access point.

A RFID reader 20a is positioned proximate to access point 18a. Similarly, RFID readers 20b and 20c are positioned proximate to access points 18b and 18c, respectively. The RFID readers 20a, 20b, and 20c are coupled to a control system 22 by communication links collectively identified by reference numeral 24. Persons of ordinary skill in the art will appreciate that the communication links 24 could be hardwired or wireless communication links although hardwired communication links may provide an enhanced level of security over wireless communication links.

FIG. 3 depicts a RFID device 26 in dashed lines at locations identified in FIG. 3 by letters a, b, c, d, and e that are successively closer to the access points 18a, 18b, and 18c, and to access point 18b in particular. As will be appreciated by persons of ordinary skill in the art, the RFID device 26 may take numerous forms, a cellular telephone being a common such device. The RFID device 26 may be carried by a person or may be, for example, attached to a vehicle.

Unlike the system 10 of FIG. 1, the system 50 of FIG. 3 incorporates two trigger points to implement the authentication process. The first set of trigger points are the RFID readers 20a, 20b, and 20c that were shown in FIG. 1 and are positioned proximate to access points 18a, 18b and 18c, respectively. The second set of trigger points are identified at reference numerals 52a, 52b, and 52c. The second set of trigger points 52a, 52b, and 52c are positioned to trigger at a distance identified by reference numeral 54 further away from the access points 18a, 18b, and 18c than the RFID readers 20a, 20b, and 20c that act as the first trigger points. The second set of trigger points 52a, 52b, and 52c may take any one or more of numerous forms, such as pressure pads, beam breaking systems, radar, sonar, or other object locating transducers or systems and communicate with the system controller 22 over communication lines 56. While the particular embodiment shown in FIG. 3 has three first trigger points 52a, 52b, and 52c, it is not important for the first trigger point to be unique to the individual access points. Because the controller knows who is authorized, other embodiments are contemplated wherein the RFID device enters an area, such as but not limited to a room, the process starts with a data exchange between the RFID device and an RFID reader not associated with a particular access point but located near an entrance to the area, e.g., a door. This data exchange could authenticate an FRID device for all or a subset of access points. A link is then established when the RFID device is at the distance close to one or more access points and the controller authorizes access since the approval process has already been completed.

Activation of the second trigger causes a communication link to be made between the RFID device 26 and an RFID reader device associated with the first trigger distance. In some embodiments of the invention, the RFID reader linked to the RFID device 26 at the first trigger distance may be the same RFID reader 20b located at the access point. In other embodiments of the invention, the RFID reader linked to the RFID device 26 at the first trigger distance may be an RFID reader different from the RFID reader 20b located at the access point, for example, an RFID reader co-located with the trigger points 52a, 52b, and 52c.

Persons of ordinary skill in the art will appreciate that there are two ways to exchange data over a wireless link such as, but not limited to, bluetooth. Either the RFID device 26 searches for RFID readers 20a, 20b, and 20c associated with an access control system with which to pair or the or the RFID readers 20a, 20b, and 20c associated with the access control system search for an RFID device 26 with which to pair. The difference between initiation of these two data exchanges is whether the RFID device 26 or the RFID readers 20a, 20b, and 20c are visible to the outside world. As an example, a bluetooth door lock available from Kwikset runs in a "quiet mode" in which the RFID device 26 of a user searches for the RFID readers and initiates the data exchange on the assumption that the lack of visibility of the RFID reader provides an enhanced level of security. Persons of ordinary skill in the art will appreciate that both methods of initiating a communication exchange are intended to fall within the scope of the present invention. Such skilled persons will also appreciate that the data exchange includes data sent from the RFID device 26 to the RFID reader that identifies the individual RFID device 26 so that it may be authenticated.

As shown in FIG. 3, when the RFID device 26 is located at position a, there is no communication link established between it and the RFID control system 22. When the RFID device 26 has proceeded to position b, it is at the first trigger point identified by dashed line 54 and a communication link is established between it and the RFID control system 22.

Once the communication link has been established, data identifying the RFID device 26 is received by the RFID reader 20b during the data exchange and is communicated to the control system 22. The control system 22 performs an authentication routine that queries an access list 32 to determine whether the RFID device is authorized to permit entry into the controlled access area 14. Performance of authentication routines is well known in the art and the present invention is not limited to use of any particular authentication process.

In accordance with one aspect of the present invention, the separation between the distance 54 from the access points 18a, 18b, and 18c at which the second trigger points 52a, 52b, and 52c are located and the distance 32 at which the RFID readers acting as the first trigger points 20a, 20b, and 20c are located may be selected to approximate the time interval between the actual times 40 and 44 of FIG. 2 reflecting the speed of approach of the RFID device 26. In this manner, the time delay at the access points identified at reference numeral 46 in FIG. 2 caused by the authentication process being performed by the control system 22 can be eliminated or at least minimized.

Figure 4:
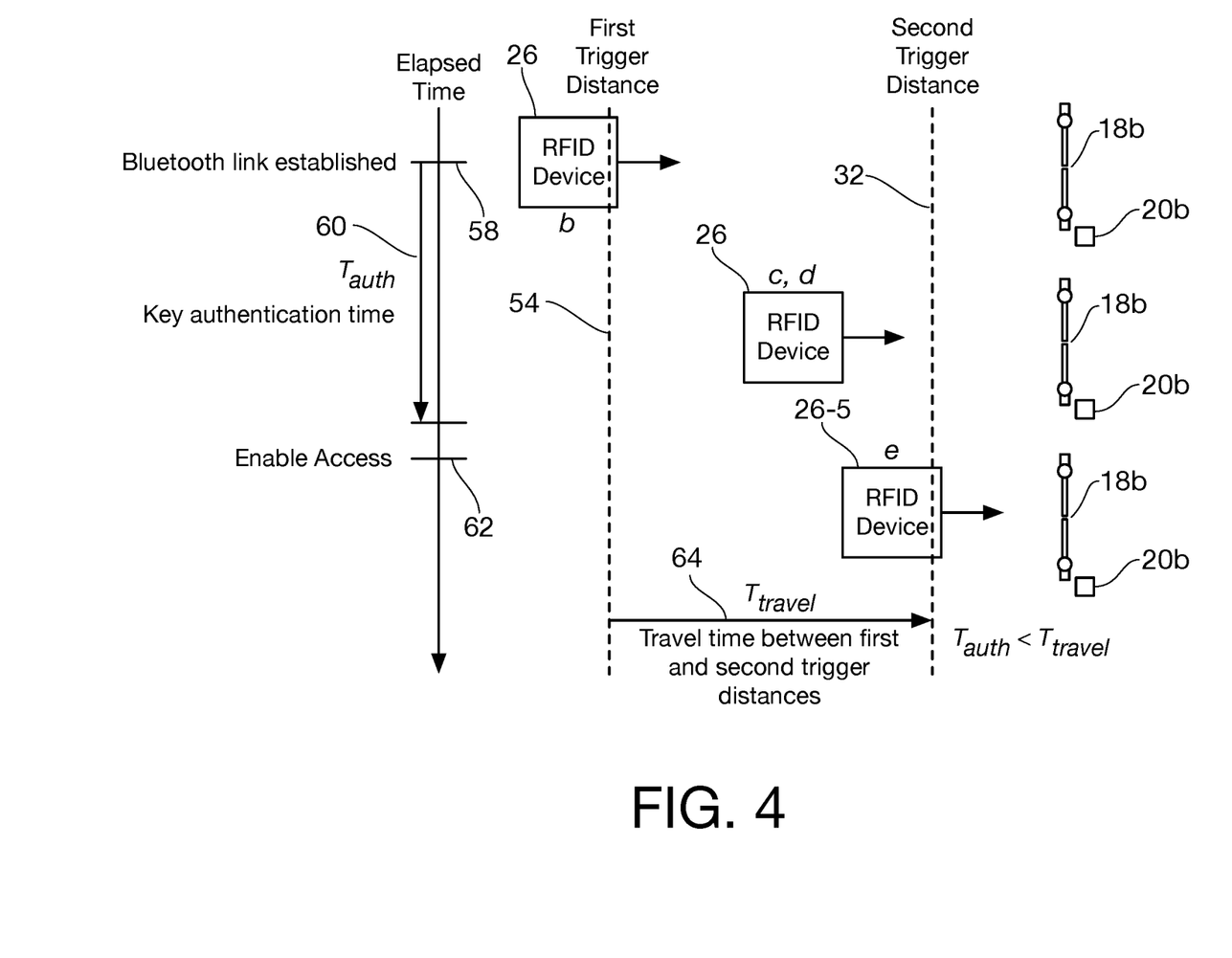
FIG. 4 is a diagram showing timing considerations for the operation of an illustrative prior-art system for operating a controlled access barrier at an access point, such as the system depicted in FIG. 3.

The difference in the time delay between the prior art system 10 of FIG. 1 and the system 50 of the present invention may be seen with reference to FIG. 4. The link is established at the first trigger point at a time indicated at reference numeral 58 when the RFID device 26 (shown at the top position) is at a distance b from the access point 18b indicated at reference numeral 54. The control system 22 then begins the authentication process. The time consumed by the authentication process ($T_{auth}$) is indicated at reference numeral 60, during which the RFID device 26 continues to move towards the access point 18b through locations b, and c as shown by the middle instance of the RFID device 26. By the time the RFID device 26 is at the position e shown at the bottom of FIG. 4, at the second trigger distance indicated at dashed line 32 as sensed by the RFID reader 20b at a time indicated as $T_{travel}$ at reference numeral 64, the authorization process performed by the system controller 22 has preferably been completed or is close to completion. Upon completion of the authentication process, the controller 22 sends a control signal to the access point 18b to enable entry through the access point 18b. In the case shown in FIG. 4, $T_{auth} < T_{travel}$ and there is no delay between the time the RFID device arrives at the second trigger distance 32 and the assertion of the control signal by the system controller 22 to the access point 18b to enable entry through the access point 18b. In some implementations of the present invention, the time $T_{auth}$ 60 may be longer than the time $T_{travel}$ 64 but in accordance with the present invention the delay is much reduced compared to the delay encountered in operating the prior-art system 10 of FIG. 1.

In accordance with some embodiments of the present invention, a communication link is not established between the RFID device 26 and the RFID readers 20a and 20c, located further away from the RFID device 26 than RFID reader 20b. In some embodiments, the controller can employ techniques such as RSSI methods using the relative signal strengths of the RFID signal sent by RFID device 26 to determine which one of access points 18a 18b, and 18c should be activated. Persons of ordinary skill in the art will readily be able to configure systems for such embodiments using, for example, the RSSI function in an IEEE 802.11 system, to trigger the data exchange process at a predetermined signal level and select or reject signals received from RFID devices depending on the relative strengths of the signals as they approach multiple access points to authorize entry at the one of multiple access points at which the received signal is the strongest. This may be particularly useful in environments such as entry to public events where a high volume of entry requests is likely to be encountered. In some embodiments of the invention, the second trigger point may include tapping a RFID device such as a cellular phone on a turnstile or performing another motion of the RFID device that is recognized by the system. For example, the system may communicate with the RFID device to enable a touch screen button on the RFID device to control the mechanism that unlocks the access point. Numerous such techniques as well as their implementations, are known in the art.

Figure 5:
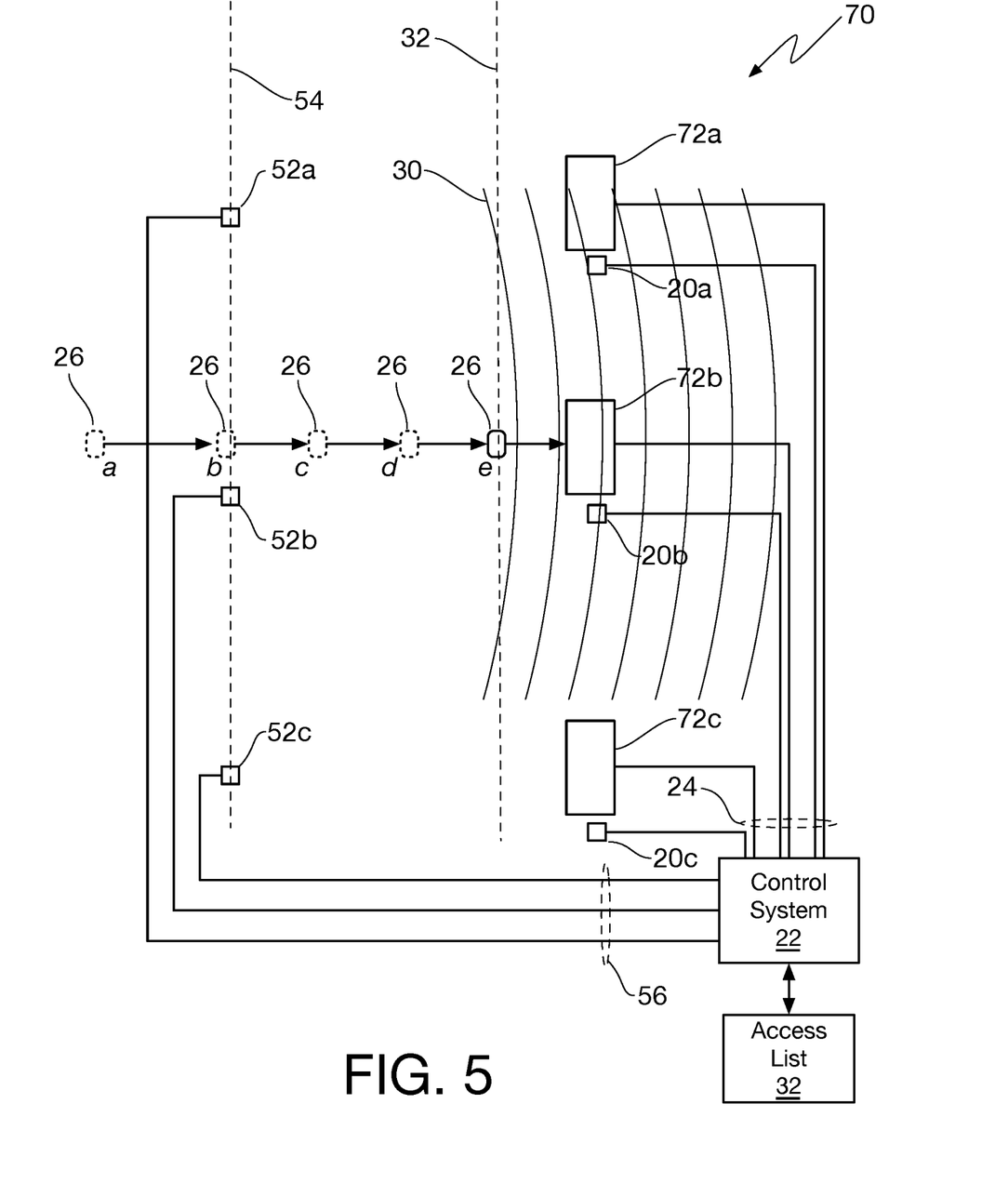
FIG. 5 is a diagram showing an illustrative system for operating an RFID system in accordance with the present invention.

Referring now to FIG. 5, a diagram shows an illustrative system 70 for operating an RFID system in accordance with the present invention Numerous elements of the system 70 of FIG. 5 are similar to elements in the system 50 of FIG. 3 and will be identified using the same reference numerals used to identify those elements in FIG. 3.

FIG. 5 shows a plurality of RFID stations 72a, 72b, and 72c. Persons of ordinary skill in the art will readily appreciate that the RFID stations 72a, 72b, and 72c could be information terminals, kiosks, pedestals, etc. Although FIG. 5 arbitrarily depicts a system for controlling three RFID stations 72a, 72b, and 72c, such skilled persons will appreciate that some applications will require but a single RFID station while other applications will require the use of more than one access point. A non-limiting example of an RFID station in accordance with the present invention is a station that grants access to certain floors in an elevator or bank of elevators based on the access privileges associated with a particular RFID device.

A RFID reader 20a is positioned proximate to RFID station 72a. Similarly, RFID readers 20b and 20c are positioned proximate to RFID stations 72b and 72c, respectively. The RFID readers 20a, 20b, and 20c are coupled to a control system 22 by communication links collectively identified by reference numeral 24. Persons of ordinary skill in the art will appreciate that, as in the embodiment of the invention depicted in FIG. 3, the communication links 24 could be hardwired or wireless communication links although hardwired communication links may provide an enhanced level of security over wireless communication links. In the non-limiting elevator example mentioned above, the credentials of a person carrying an RFID device can be verified prior to the person entering a selected elevator. At the time the person enters the elevator, the buttons for one or more particular authorized floors have already been enabled.

FIG. 5 depicts a RFID device 26 in dashed lines at locations identified in FIG. 5 by letters a, b, c, d, and e that are successively closer to the RFID stations, and to RFID station 72b in particular. As will be appreciated by persons of ordinary skill in the art, the RFID device 26 may take numerous forms, a cellular telephone being a common such device. The RFID device 26 may be carried by a person or may be, for example, attached to a vehicle.

Like the system 50 of FIG. 3, the system 70 of FIG. 5 incorporates two trigger points to implement the authentication process. The first set of trigger points are the RFID readers 20a, 20b, and 20c that were shown in FIGS. 1 and 3 and are positioned proximate to RFID stations 72a, 72b, and 72c, respectively. The second set of trigger points are identified at reference numerals 52a, 52b, and 52c. The second set of trigger points 52a, 52b, and 52c are positioned to trigger at a distance identified by reference numeral 54 further away from the RFID stations 72a, 72b, and 72c than the RFID readers 20a, 20b, and 20c that act as the first trigger points. The second set of trigger points 52a, 52b, and 52c may take any one or more of numerous forms, such as pressure pads, beam breaking systems, radar, sonar, or other object locating transducers or systems and communicate with the system controller 22 over communication lines 56. Activation of the second trigger causes a communication link to be established between the RFID device 26 and an RFID reader device associated with the first trigger distance. In some embodiments of the invention, the RFID reader linked to the RFID device 26 at the first trigger distance may be the same RFID reader 20b located at the access point. In other embodiments of the invention, the RFID reader linked to the RFID device 26 at the first trigger distance may be an RFID reader different from the RFID reader 20b located at the RFID station 72b, for example, an RFID reader co-located with the trigger points 52a, 52b, and 52c. While, as in the embodiment illustrated in FIG. 3, the particular embodiment shown in FIG. 5 has three first trigger points 52a, 52b, and 52c, it is not important for the first trigger point to be unique to the individual RFID stations 72a, 72b, and 72c. Because the controller knows who is authorized, other embodiments are contemplated wherein the RFID device enters an area, such as but not limited to a room, the process starts with a data exchange between the RFID device and an RFID reader not associated with a particular RFID station but located near an entrance to the area, e.g., a door. This data exchange could authenticate an FRID device for all or a subset of RFID stations or access points. A link is then established when the RFID device is at the distance close to one or more RFID stations and the controller authorizes access since the approval process has already been completed.

As shown in FIG. 5, when the RFID device 26 is located at position a, there is no communication link established between it and the RFID control system 22. When the RFID device 26 has proceeded to position b, it is at the first trigger point identified by dashed line 54 and a communication link is established between it and the RFID control system 22.

Once the communication link has been established, data identifying the RFID device 26 is received by the RFID reader 20b and is communicated to the control system 22. The control system 22 performs an authentication routine that queries an access list 32 to determine whether the RFID device is known, and what privileges are associated with it. Performance of authentication routines is well known in the art and the present invention is not limited to use of any particular authentication process.

In accordance with one aspect of the present invention, the separation between the distance 54 from the RFID stations 72a, 72b, and 72c at which the second trigger points 52a, 52b, and 52c are located and the distance 32 at which the RFID readers acting as the first trigger points 20a, 20b, and 20c are located may be selected to approximate the time interval between the actual times 40 and 44 of FIG. 2 and FIG. 4 reflecting the speed of approach of the RFID device 26. In this manner, the time delay at the RFID stations identified at reference numeral 46 in FIG. 2 caused by the authentication process being performed by the control system 22 can be eliminated or at least minimized.

In accordance with this aspect of the present invention, the authentication and access process performed by the system is commenced at a predetermined signal level which then starts the authentication process. The system and method uses a dual set of triggers (of which RSSI can be one) wherein the first trigger starts the authentication process and the second one activates the control systems. As a non-limiting example, the first trigger may be set to occur at a distance of about three feet and the second trigger may be set to occur at a distance of about six inches. The authentication process can be completed or almost completed during the time it takes a person carrying or wearing the RFID device to travel the almost three feet. When the second trigger occurs, the control system can be triggered immediately. From the perspective of the user, the response time is minimal, but the authentication time required is the same as in the prior-art systems.

Figure 6:
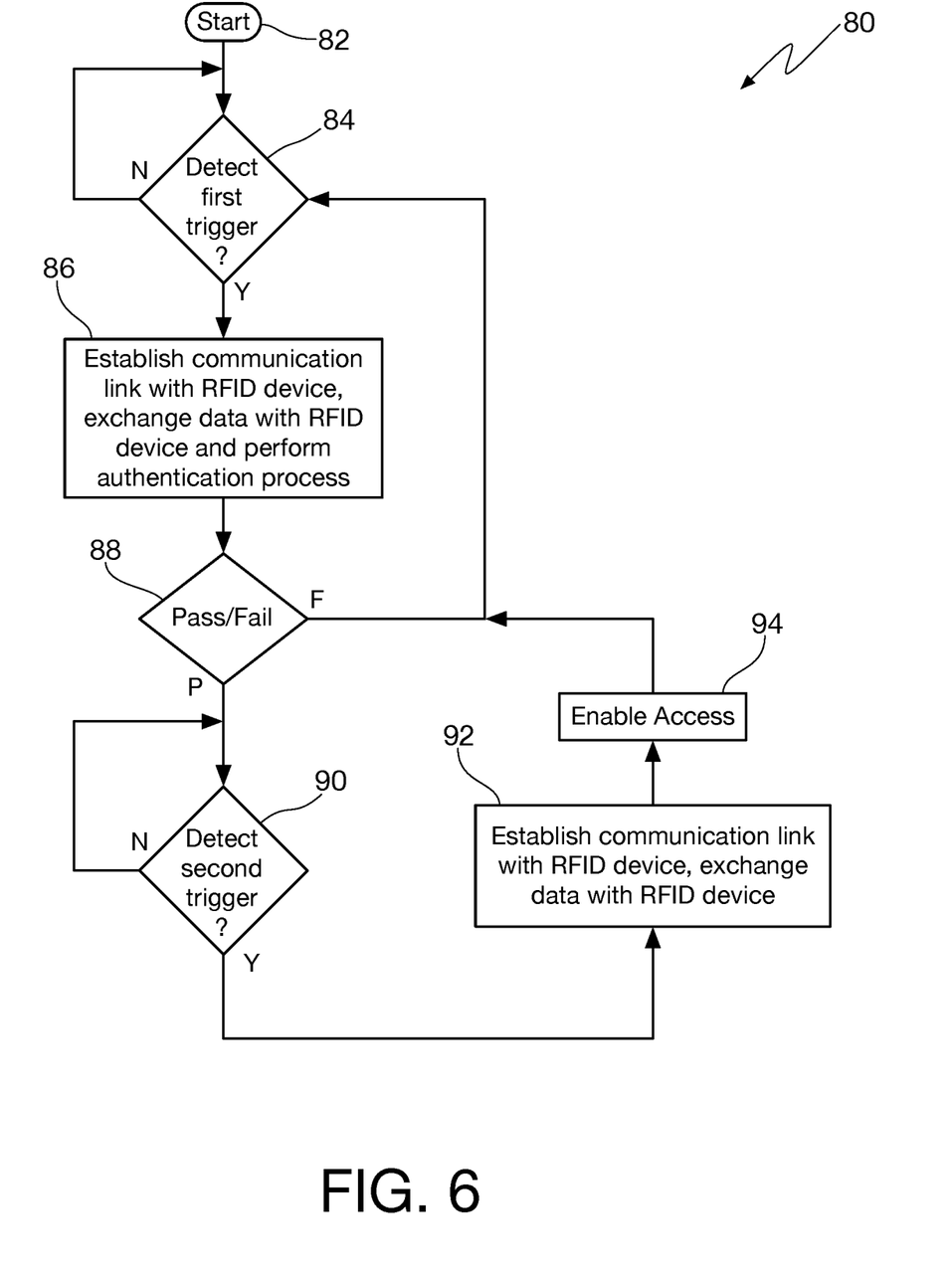
FIG. 6 is flow diagram illustrating a method in accordance with an aspect of the invention.

Referring now to FIG. 6, a flow diagram shows an illustrative method 80 for granting access to a controlled access area in accordance with one aspect of the present invention. The method begins at reference numeral 82.

At reference numeral 84, the system polls the RFID readers associated with the first trigger points. The method loops through this polling until a first trigger is detected at a first trigger point. The first trigger could be the establishing of a communication link with an approaching RFID device or another trigger as disclosed herein followed by establishing a communication link with the RFID device at the first trigger point. The method then proceeds to reference numeral 86 where a communication link is established with the RFID device (if such a link has not already been established at reference numeral 84), data is exchanged with the RFID device and the authentication process is performed.

At reference numeral 88 it is determined if the authentication process has authenticated the detected RFID device. If the device has not been authenticated, access will not be granted and the method returns to the loop at reference numeral 82. If the device has been authenticated, access will be granted and the method proceeds to reference numeral 90, where the system polls the second trigger point for detection of the authenticated RFID device at a predetermined distance range. As was noted with respect to the first trigger point, the second trigger point could itself be the establishment of a communication link with the RFID device. When a communication link has been established with the authenticated RFID device at reference numeral 92, the system enables access to the controlled access area through the controlled access barrier by enabling passage through the controlled access barrier at reference numeral 94. The method returns to the loop at reference numeral 84 to await detection of another user/RFID device at the first trigger point. Persons of ordinary skill in the art will appreciate that the establishment of the communication link with the RFID device at reference numerals 86 and 92 can be initiated either by the RFID device or by the system with which the RFID device is communicating.

Figure 7:
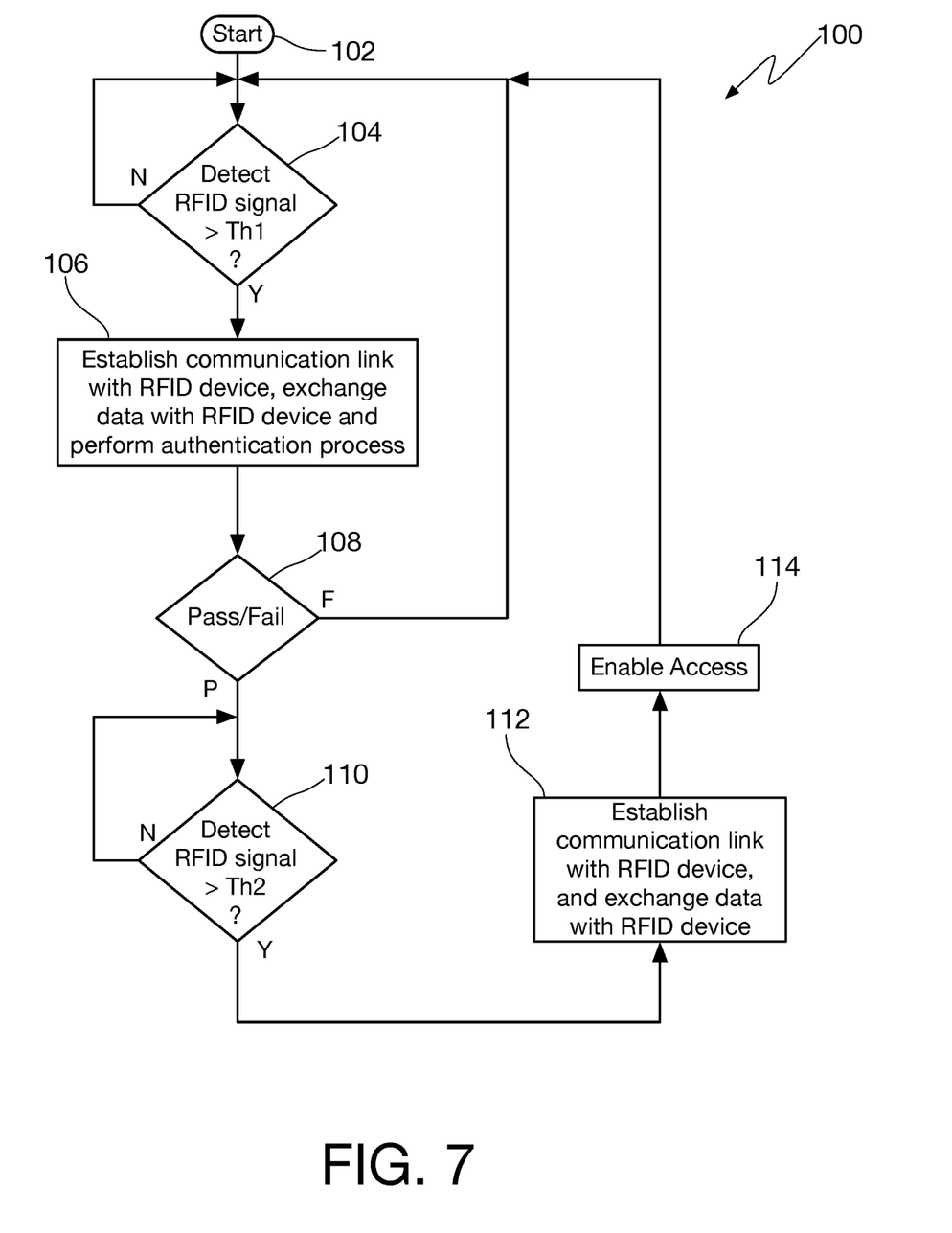
FIG. 7 is a flow diagram illustrating a method in accordance with an aspect of the invention.

Referring now to FIG. 7, a flow diagram shows an illustrative method 100 for granting access to a controlled access area in accordance with one aspect of the present invention. The method begins at reference numeral 102.

At reference numeral 104, the system polls the RFID readers associated with the first trigger points. The method loops through this polling until an RFID device is detected at the first trigger point at a signal strength exceeding a first threshold. The first trigger could be the establishing of a communication link with an approaching RFID device or another trigger as disclosed herein followed by establishing a communication link with the RFID device at the first trigger point. The method then proceeds to reference numeral 106 where a communication link is established with the RFID device (if not already established at reference numeral 104), data is exchanged with the detected RFID device and the authentication process is performed.

At reference numeral 108 it is determined if the authentication process has authenticated the detected RFID device. If the device has not been authenticated, access will not be granted and the method returns to the loop at reference numeral 102. If the device has been authenticated, access will be granted and the method proceeds to reference numeral 110, where the system polls the second trigger point for detection of the authenticated RFID device at a predetermined distance range represented by, for example, a signal strength threshold. As was noted with respect to the first trigger point, the second trigger point could itself be the establishment of a communication link with the RFID device. When a communication link has been established with the authenticated RFID device at reference numeral 112, the system enables access to the controlled access area through the controlled access barrier by enabling passage through the controlled access barrier at reference numeral 114. The method returns to the loop at reference numeral 104 to await detection of another user/RFID device at the first trigger point.

Figure 8:
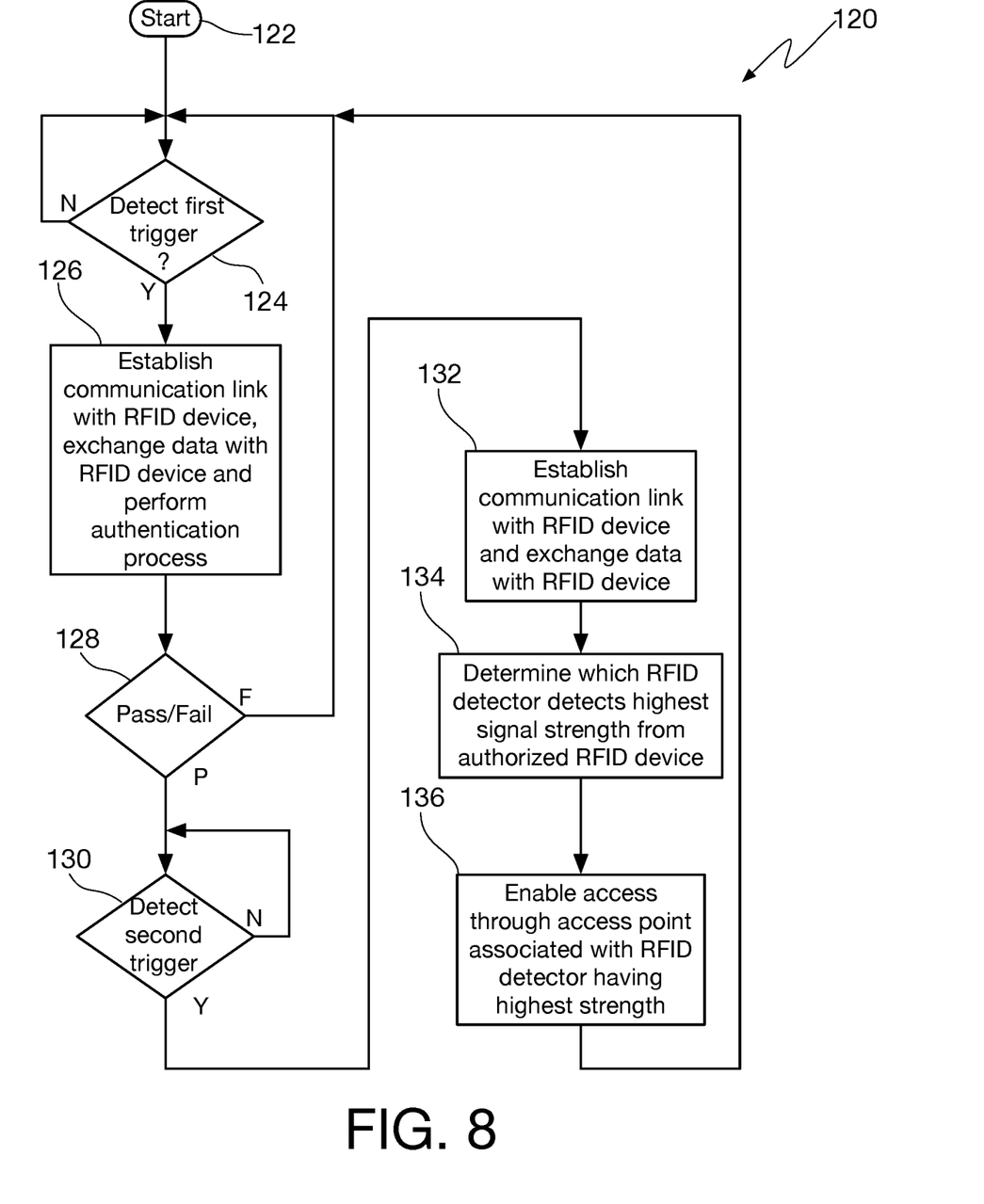
FIG. 8 is a flow diagram illustrating a method in accordance with an aspect of the invention.

Referring now to FIG. 8, a flow diagram shows an illustrative method 120 for granting access to a controlled access area through one of a plurality of controlled access points in accordance with one aspect of the present invention. The method begins at reference numeral 122.

At reference numeral 124, the system polls the first trigger points. The method loops through this polling until an event is detected at a first trigger point. At reference numeral 126, the system establishes a communication link with the RFID device. Persons of ordinary skill in the art will appreciate that the detected event could be the establishment of a link with the RFID device. The method then proceeds to reference numeral 126 where data is exchanged with the RFID device over the communication link and the authentication process is performed.

A reference numeral 128 it is determined if the authentication process has authenticated the detected RFID device. If the device has not been authenticated, access will not be granted and the method returns to the loop at reference numeral 124. If the device has been authenticated, access will be granted and the method proceeds to reference numeral 130, where the system polls for an event at the second trigger point. The event may be detection of the authenticated RFID device at a predetermined distance range.

At reference numeral 132 a communication link is established in response to the second trigger event. When the authenticated RFID device has been detected at the predetermined distance range, at reference numeral 134 the system determines which one of the RFID detectors at the second trigger point near the controlled access points has detected the signal from the authorized RFID device at the highest signal strength, indicating that the particular controlled access point is the one being approached by the RFID device. At reference numeral 136, the system enables access to the controlled access area through the selected controlled access barrier by enabling passage through the selected controlled access barrier. The method returns to the loop at reference numeral 124 to await detection of another user/RFID device at the first trigger point.

Persons of ordinary skill in the art will appreciate that the establishment of the communication link with the RFID device at reference numerals 126 and 130 can be initiated either by the RFID device or by the system with which the RFID device is communicating.

Reference numerals 94, 114, and 136 in FIGS. 6, 7, and 8, respectively, recite enabling access as shown and described with reference to FIG. 3. Persons of ordinary skill in the art will appreciate that these reference numerals also apply to the processes performed at RFID stations 72a, 72b, and 72c that do not themselves provide access to controlled spaces but authorize such access.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A system for operating a controlled access barrier at an access point comprising:
   a remotely operable access point at an authentication point;
   a first trigger sensor located at a first trigger distance from the authentication point and configured to perform a data exchange with an RFID device associated with a user;
   a controller responsive to data received from the RFID device to determine from the exchanged data whether to authenticate the user and authenticating the user only if the exchanged data indicates the user should be authenticated;
   a second trigger sensor located at a second trigger distance closer to the authentication point than the first trigger distance and configured to perform a data exchange with the RFID device; and
   the controller being responsive to data received from the RFID device at the second trigger sensor to enable the controlled access barrier to grant access to the user at the access point after exchanging data with the RFID device at the second trigger sensor only if the user has been authenticated.

2. The system of claim 1 wherein:
   the authentication point is a remotely operable access barrier at an access point; and
   the controller being responsive to the RFID signal detected at the second trigger sensor to operate the remotely operable access barrier only if the user has been authenticated.

3. The system of claim 2 wherein the remotely operable access barrier is a turnstile.

4. The system of claim 2 wherein the remotely operable access barrier is a door.

5. The system of claim 2 wherein the remotely operable access barrier is an elevator.

6. The system of claim 5 wherein the elevator is operated to grant access to a selected floor serviceable by the elevator.

7. The system of claim 1 wherein:
   the authentication point is a kiosk;
   the system controls the kiosk to direct a user of the RFID device to a selected remotely operable access barrier at the access point; and
   the controller being responsive to data exchanged with the RFID device at the selected remotely operable access barrier at the access point to operate the selected remotely operable access barrier only if the user has been authenticated.

8. The system of claim 1 wherein the controller is configured to initiate exchange of data with the RFID device.

9. The system of claim 1 wherein the controller is configured to exchange data with the RFID device in response to communication of data from the RFID device.

10. A method for operating one of a plurality of controlled access barriers at an access point comprising:
    exchanging data with an RFID device associated with a user from a first trigger sensor;
    determining from the detected RFID signal whether to authenticate the user; and detecting by at least one of the controlled access barriers, the RFID signal from the device at a second trigger sensor occurring after the first trigger sensor; and only if the user has been authenticated, operating the one of the at least one controlled access barriers from which the detected RFID signal from the device is the strongest to grant access to the user at the access point in response to the second trigger sensor.

\* \* \* \* \*